(12) United States Patent
Bruck et al.

(10) Patent No.: US 9,664,291 B2
(45) Date of Patent: *May 30, 2017

(54) VALVE, IN PARTICULAR PILOT-OPERATED PROPORTIONAL DIRECTIONAL POPPET VALVE

(71) Applicant: Hydac Fluidtechnik GmbH, Sulzbach/Saar (DE)

(72) Inventors: Peter Bruck, Althornbach (DE); Markus Bill, Heusweiler (DE)

(73) Assignee: HYDAC FLUIDTECHNIK GMBH, Sulzbach/Saar (DE)

( * ) Notice: Subject to any disclaimer, the term of this patent is extended or adjusted under 35 U.S.C. 154(b) by 141 days.

This patent is subject to a terminal disclaimer.

(21) Appl. No.: 14/417,912

(22) PCT Filed: Jul. 18, 2013

(86) PCT No.: PCT/EP2013/002129
§ 371 (c)(1),
(2) Date: Jan. 28, 2015

(87) PCT Pub. No.: WO2014/019647
PCT Pub. Date: Feb. 6, 2014

(65) Prior Publication Data
US 2015/0323083 A1    Nov. 12, 2015

(30) Foreign Application Priority Data

Aug. 3, 2012 (DE) .................. 10 2012 015 354

(51) Int. Cl.
*F16K 31/12* (2006.01)
*F16K 1/52* (2006.01)
(Continued)

(52) U.S. Cl.
CPC ............. *F16K 1/526* (2013.01); *F15B 13/015* (2013.01); *F16K 21/04* (2013.01); *F16K 31/122* (2013.01);
(Continued)

(58) Field of Classification Search
CPC ....... F16K 15/26; F16K 31/408; F16K 13/015
(Continued)

(56) References Cited

U.S. PATENT DOCUMENTS 3,604,446 A * 9/1971 Brooks ................. F16K 17/105
137/115.03
4,746,093 A * 5/1988 Scanderbeg .......... F15B 13/015
251/282
(Continued)

FOREIGN PATENT DOCUMENTS

CH        671 080 A5    7/1989
DE      197 55 120 A1    9/1998
(Continued)

*Primary Examiner* — Umashankar Venkatesan
(74) *Attorney, Agent, or Firm* — Wenderoth, Lind & Ponack, L.L.P.

(57) ABSTRACT

A valve, in particular a pilot-operated proportional directional poppet valve, has a valve housing (7) with a fluid inlet (21) and a fluid outlet (23). The fluid stream between the fluid inlet (21) and the fluid outlet (23) is adjustable by a main piston (27). A pilot valve chamber (37) on a rear face (29) of the main piston (27) has a pilot valve closing member (33) movable by an actuating device (69) to adjust the fluid stream between the pilot valve chamber (37) and the fluid outlet (23). A supply aperture (3) is between the fluid inlet (21) and the pilot valve chamber (37). The opening cross-section of the supply aperture (3) can be reduced by a control element (49).

24 Claims, 4 Drawing Sheets

(51) Int. Cl.
  *F16K 21/04* (2006.01)
  *F16K 31/122* (2006.01)
  *F16K 31/40* (2006.01)
  *F15B 13/01* (2006.01)

(52) U.S. Cl.
  CPC ........ *F16K 31/408* (2013.01); *Y10T 137/7755* (2015.04)

(58) Field of Classification Search
  USPC .................. 137/115.03, 486, 115.09, 504
  See application file for complete search history.

(56) References Cited

U.S. PATENT DOCUMENTS

| | | | |
|---|---|---|---|
| 6,886,802 B2 * | 5/2005 | Bartolacelli | F16K 31/408 251/129.15 |
| 2010/0294962 A1 * | 11/2010 | Bill | F16K 31/408 251/30.01 |

FOREIGN PATENT DOCUMENTS

| | | |
|---|---|---|
| DE | 199 55 522 A1 | 5/2001 |
| DE | 101 02 409 A1 | 7/2002 |
| DE | 10 2010 001 881 A1 | 8/2011 |
| EP | 2 363 623 A1 | 9/2011 |
| WO | WO 02/14696 A2 | 2/2002 |

* cited by examiner

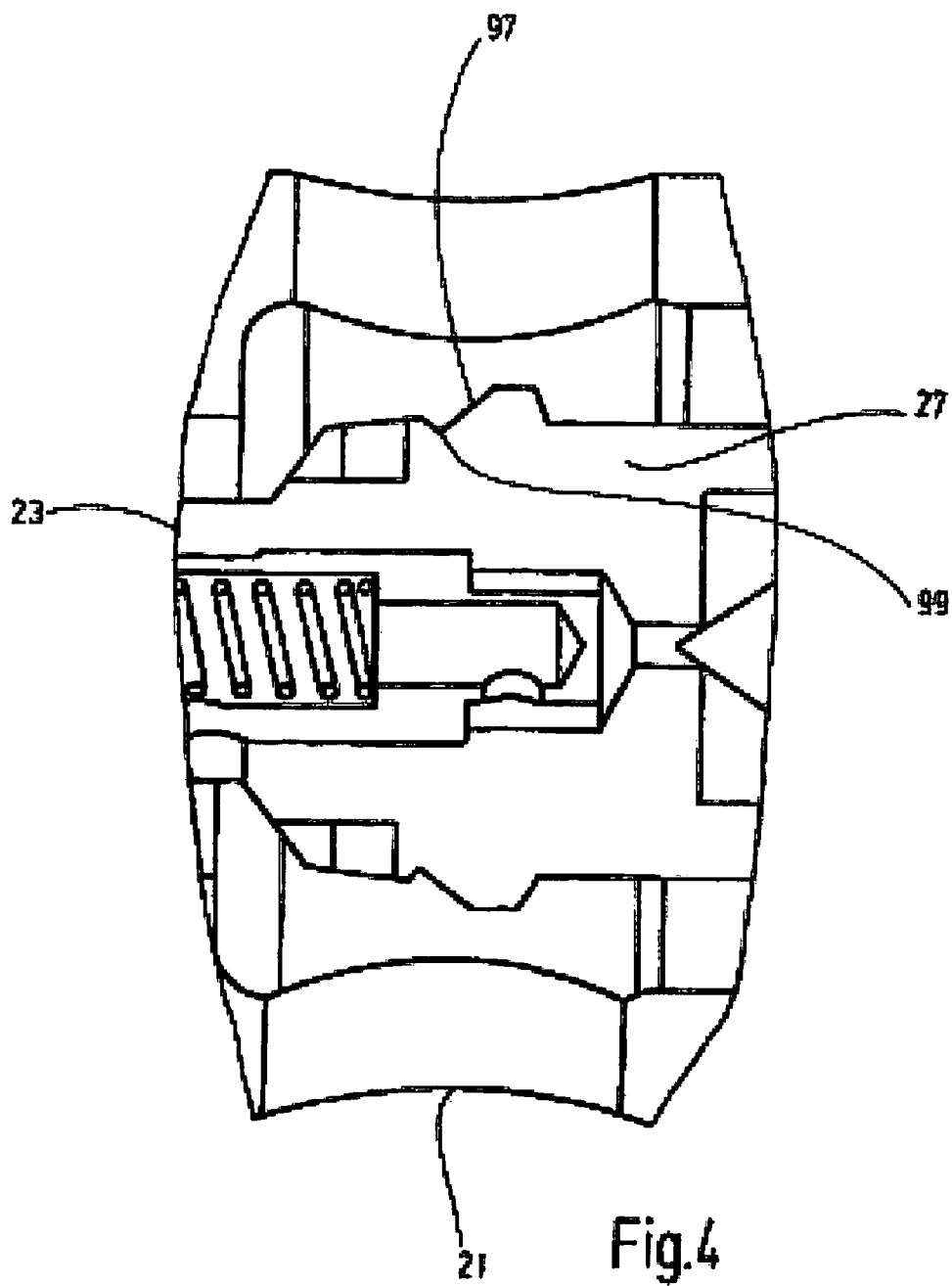

VALVE, IN PARTICULAR PILOT-OPERATED PROPORTIONAL DIRECTIONAL POPPET VALVE

FIELD OF THE INVENTION

The invention relates to a valve, in particular a pilot-operated proportional directional poppet valve, having a valve housing with a fluid inlet and a fluid outlet. A fluid stream between the fluid inlet and the fluid outlet is adjustable by a main piston. A pilot valve chamber on a rear face of the main piston has a pilot valve closing member movable by an actuating device to adjust the fluid stream between the pilot valve chamber and the fluid outlet. A supply aperture is disposed between the fluid inlet and the pilot valve chamber.

BACKGROUND OF THE INVENTION

In the case of fork-lift trucks, loads of load forks are often lowered in a proportional manner by poppet valves having a constant opening behavior. The poppet valves in this case can be directly actuated or can be pilot-operated. The use of poppet valves is necessary, in particular, because fork-lift truck manufacturers require a "stacker-tight" load behavior allowing for only very minimal leakage. By preventing leakage in the hydraulic circuit, the load fork cannot lower on its own with or without a load, which would pose a safety problem.

In the known solutions, a load-independent limitation of maximum volumetric flow is carried out by a constant volumetric flow controller connected in series to the other components of the hydraulic circuit. The requirement that a maximum lowering speed of a load fork cannot be exceeded, independently of the prevailing load pressure, is met in this manner. The known control devices associated therewith have the disadvantage that, when the load forks are lowered without a load, only the dead weight of the moving parts, in particular in the form of the load forks, is available at the lift mast for pumping the hydraulic fluid from the working cylinder (plunger cylinder) back to the tank as a component of the hydraulic circuit. In certain designs of lift masts, the pressure at the cylinder can fall to values <10 bar. The greater the number of components through which fluid must flow during lowering, the lesser is the volumetric flow. In this connection, the known constant volumetric flow controller poses a particularly difficult obstacle to overcome, because the supply aperture thereof must be selected such that it is small enough that a control pressure differential of at least 7 bar can be established. Lesser control pressures would result in an unstable behavior in the hydraulic circuit of the working device and cannot be accepted for reasons of safety. Moreover, small regulating pressure differentials also must not result in noticeable impairments of lowering speeds. The use of a maximum volumetric flow limiter also has the disadvantage that, when transitioning from the maximum volumetric flow limitation back to the proportional characteristic curve, a disadvantageous rebound occurs. The rebound is manifested as a discontinuous movement of a load fork, which movement can pose another safety problem. Finally, a flow controller that is connected in series causes a not inconsiderable loss in pressure, which greatly slows the lowering of the load.

In addition, customers require a decreasing characteristic curve for the volumetric flow controller. For reasons of safety and practicality, the lowering speed must remain the same or slow down as the load increases. If this feature is carried out with the known control devices using the constant volumetric flow controller, this circumstance also results, in principle, in increased instability within the hydraulic circuit.

As an alternative to the solution having a maximum volumetric flow controller that is connected in series, the applicant has disclosed, in DE 101 02 409 A1, a control device in which a proportional directional poppet valve and a pressure regulator are connected in series in a hydraulic circuit. The users of these solutions now further require a valve that is even more cost-effective and requires less installation space.

SUMMARY OF THE INVENTION

The problem addressed by the invention is providing an improved valve, in particular a pilot-operated proportional directional control valve, which is substantially leakage-free where the lowering speed is independent of the prevailing load pressure, where the operation is without noticeable impairments of lowering speed at pressure differentials less than 10 bar, and where it is also low-effective and requires little installation space.

This problem is basically solved by a valve, in particular a pilot-operated proportional directional poppet valve, having a flow controller integrated into the valve. According to the invention, the opening cross-section of the supply aperture can therefore be reduced by a control element. The reduced cross-section of the supply aperture causes the pressure in the pilot valve chamber to drop. By this measure, active regulation of the opening stroke of the main piston can occur in addition to the regulation at the pilot valve seat. The smaller the differential pressure is between the fluid inlet and the fluid outlet, the greater the extent to which the opening stroke of the valve can be adjusted. The flow-control function is therefore made possible.

Due to this solution, an additional series-connected constant volumetric flow controller or a likewise series-connected pressure regulator is advantageously eliminated. As a result, production costs are reduced, and the amount of installation space required is substantially reduced.

Given that only the fluid passing through the pilot valve chamber is regulated in terms of volumetric flow, instead of the entire fluid stream, as is the case with the known solutions having a downstream volumetric flow controller or a pressure regulator, a smaller pressure loss and, therefore, greater efficiency, are also obtained.

Therefore, the opening stroke of the main piston can be made dependent on the differential pressure of the valve. The greater the differential pressure, the smaller the opening stroke of the valve that can be set. A flow-control function is therefore possible in which an inlet metering aperture can operate alone, without an additional flow-control edge. To ensure that the amount of pilot fluid specified by the constant flow controller can pass through the inlet metering aperture, an aperture cross-section must be opened with a size that varies according to the differential pressure. The load-dependent, variable opening cross-section of the inlet metering orifice is a prerequisite for a load-independent volumetric flow through the valve.

Preferably, the control element is assigned to the pilot valve closing member. For example, the control element can be designed as a radial projection on the pilot valve closing member. Therefore, the opening cross-section of the supply aperture can be changed by an axial or rotating movement of the pilot valve closing member. Providing a separate control device for the control element is then no longer necessary.

Particularly advantageously, the control element is designed as a collar on the pilot valve closing member, wherein the collar has at least one pressure-relief bore. A collar is a circumferential projection or flange on the pilot valve closing member. This configuration has the advantage that the pilot valve closing member is additionally centered relative to the main piston, and the projection on the pilot valve closing member is always oriented toward the supply aperture. A plurality of pressure-relief bores, which are disposed so as to be distributed over the circumference, can also be provided.

In a particularly advantageous embodiment, the supply aperture comprises a plurality of aperture bores, wherein the opening cross-section of at least one aperture bore can be reduced by the control element. By splitting the supply aperture into a plurality of aperture bores, the supply aperture in a plurality of opening stages can be easily controlled. In addition, the aperture bores preferably have the same diameter. The aperture bores can also have different diameters to additionally adapt the control behavior of the valve to the different prevailing load pressures and to provide the adjustment with a characteristic that deviates from linearity.

The aperture bores are conveniently disposed in the main piston and are offset relative to one another axially and/or over the circumference. This arrangement of the aperture bores also simplifies the reduction of the opening cross-section by the pilot valve closing member. By the axial displacement of the pilot valve closing member relative to the main piston, one or more aperture bores that are located one behind the other in the axial direction can be closed. In addition, aperture bores that are distributed over the circumference are easier to produce since the aperture bores have sections having different diameters. Therefore, overlapping aperture bores or weaknesses in the wall of the main piston caused by a plurality of concentrically disposed aperture bores can be avoided.

An aperture slot is conveniently provided between the fluid inlet and the supply aperture, which aperture slot is preferably designed in the form of an annular gap between the valve housing and the main valve piston. The aperture slot has a filtration function and is intended to prevent particles in the fluid from entering the downstream units of the pilot valve. These particles can result in obstructions of the pilot valve and, therefore, in the failure of the valve as a whole.

In a particularly preferred embodiment, a maximum volumetric flow controller is provided in the main piston in an outflow between the pilot valve chamber and the fluid outlet. The flow of the outflowing pilot fluid can be advantageously adjusted independently of the load by the maximum volumetric flow controller. In this manner, the pressure in the pilot valve chamber is increased such that the opening stroke of the main piston is reduced in a manner that is independent of the load pressure. Therefore, the valve opens to a lesser extent in the presence of a high load pressure that results, for example, from a high load on a load fork of a fork-lift truck. The lowering speed of the load fork is therefore advantageously reduced. By integrating the maximum volumetric flow controller into the main piston, practically no additional installation space is required. A considerable amount of installation space is therefore saved as compared to the solutions from the prior art that have downstream control elements.

The maximum volumetric flow controller preferably comprises a control piston, which is acted upon on a front face by pressure of the fluid flowing out of the pilot chamber and is acted upon on a rear face by a spring. In addition, the control piston can be acted upon by the pressure in the spring chamber (this is the pressure that is reduced by the supply aperture). This design has the advantage that it requires only a minimum number of parts, which advantageously move in only one direction. Such a maximum volumetric flow controller is therefore easy to manufacture and adjust.

In addition, a fluid channel can be provided in the control piston, and control edges of the maximum volumetric flow controller can be formed in the control piston and in the main piston by bores. The size of the opening cross-section that is limited by the control edges is dependent on the position of the control piston. The throttle function of the maximum volumetric flow controller is therefore provided in a particularly simple manner.

Advantageously, the fluid channel has a lateral inlet opening on the control piston.

The control piston can be inserted into an axial bore of the main piston and, preferably, can be held in the axial bore by an end cap. This arrangement can be manufactured particularly efficiently and can save installation space.

Advantageously, the main piston is acted on, via the pilot valve closing member, by a spring when in a closed position. This arrangement ensures that the valve is largely leakage-free in the neutral position, thereby ensuring that a load fork does not lower, for example, during a relatively long stand-still time. In addition, when the pilot fluid stream onto the rear face of the control piston is interrupted, the load pressure acts at the fluid inlet, whereby the closing force of the main piston is increased and a very good sealing effect between the fluid inlet and the fluid outlet is achieved.

The pilot valve closing member can be drawn away from a pilot valve seat by the actuating device. The pulling design of the actuating device is also advantageous in light of the aforementioned safety aspect.

Other objects, advantages and salient features of the present invention will become apparent from the following detailed description, which, taken in conjunction with the drawings, discloses a preferred embodiment of the present invention.

BRIEF DESCRIPTION OF THE DRAWINGS

Referring to the drawings that form a part of this disclosure.

FIG. 4 is a side view in section of the main piston of the valve of FIG. 1 in the region of the fluid inlet.

DETAILED DESCRIPTION OF THE INVENTION

Figure 1:
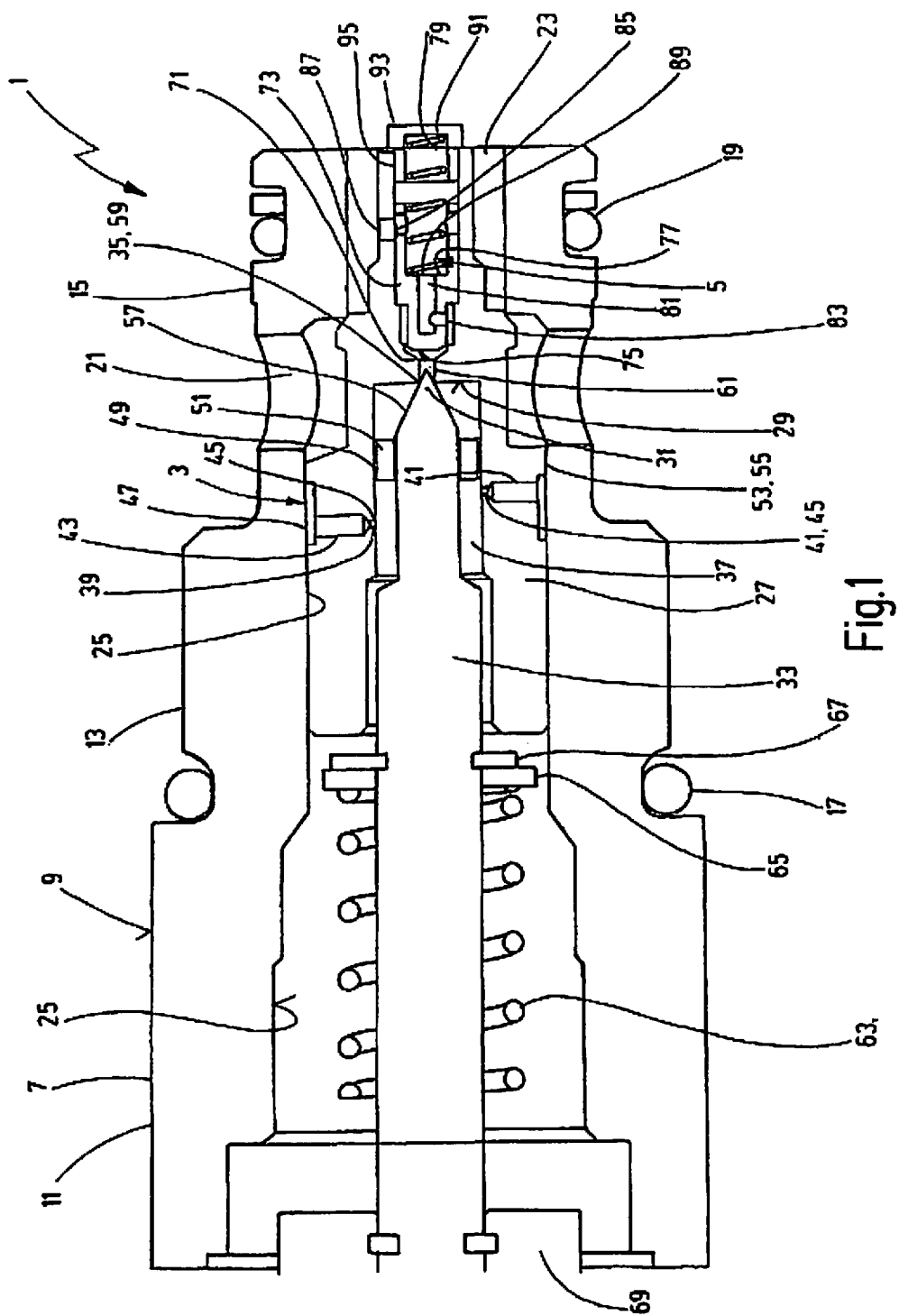
FIG. 1, is a side view in section of a valve according to an exemplary embodiment of the invention, with the valve shown in the closed neutral position.
Figure 2:
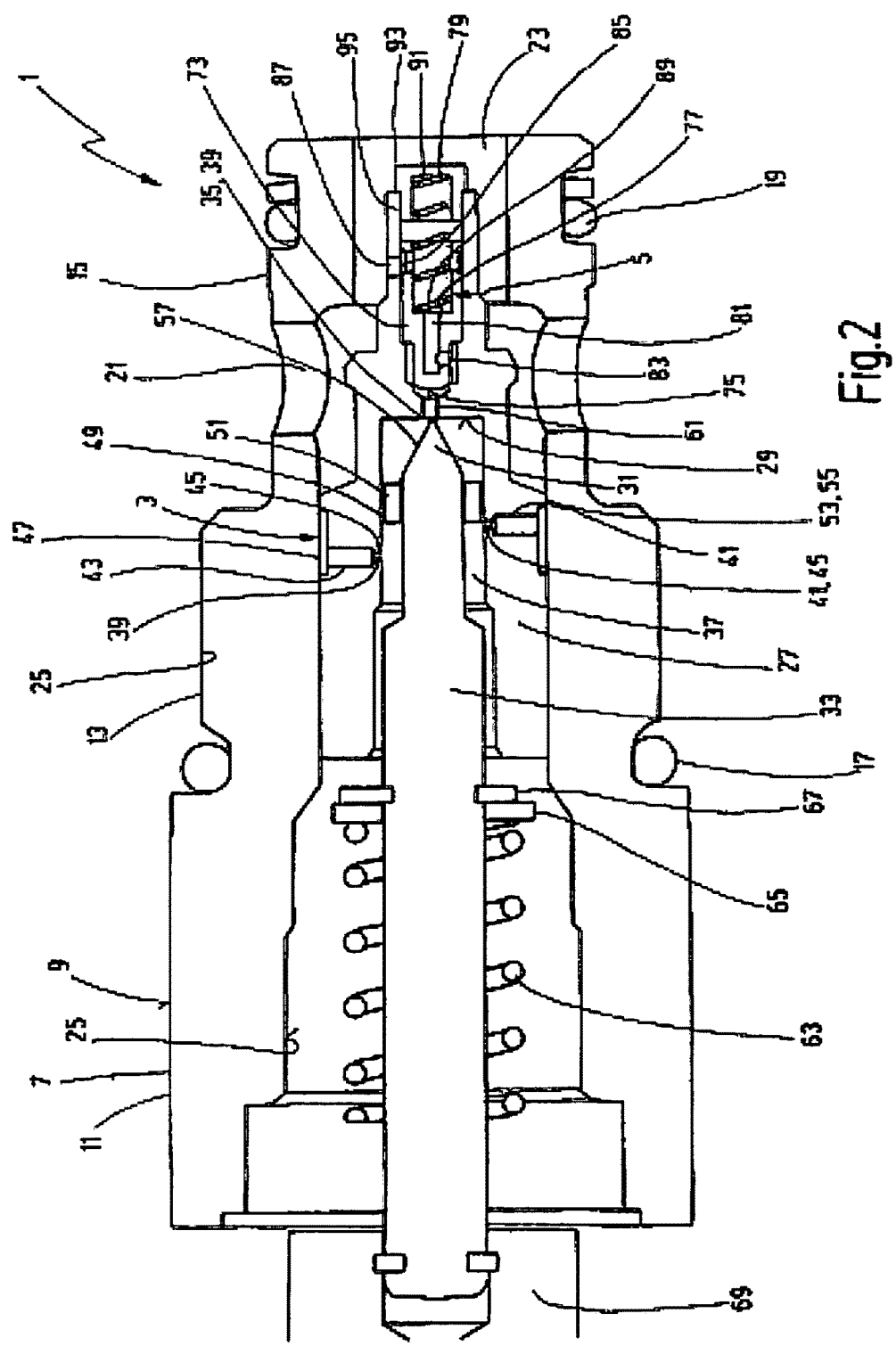
FIG. 2 is a side view in section of the valve of FIG. 1 in a working position with a low prevailing load pressure.
Figure 3:
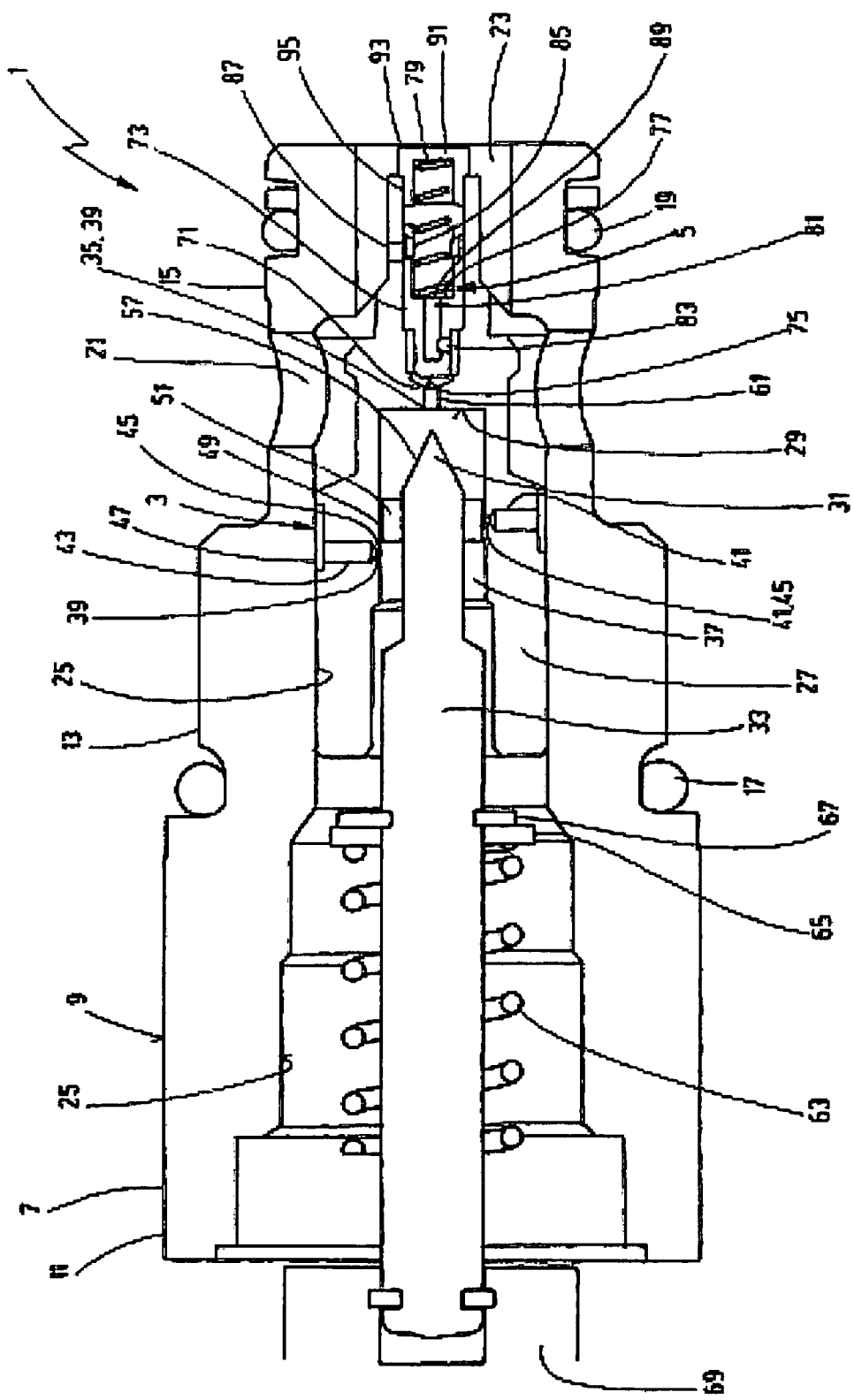
FIG. 3 is a side view in section of the valve of FIG. 1 in a working position with a high prevailing load pressure, in which the opening stroke of the main piston is adjusted, i.e., reduced.

In FIGS. 1 to 3, the valve 1 is designed as a pilot-operated proportional directional valve having a cartridge design. The design is based on a conventional proportional directional poppet valve, into which a reducible supply aperture 3 and a maximum volumetric flow controller 5 have been integrated.

The valve 1 can be inserted into a valve block, which is not depicted in greater detail. To this end, the valve housing 7 is designed so as to taper in steps on the circumferential side 9. The individual steps are designed as a hexagonal step 11, a threaded step 13, and a simple step 15, and are sealed by circumferential annular seals 17, 19. The valve housing 7 comprises a lateral fluid inlet 21 and a fluid outlet 23 at the base. A main piston 27 is inserted into an axial bore 25 of the valve housing 7. The fluid stream between the fluid inlet 21 and the fluid outlet 23 can be regulated by the main piston 27.

A pilot valve 31 is provided on a rear face 29 of the main piston 27. The pilot valve 31 comprises a pilot valve closing member 33, which interacts with a pilot valve seat 35 in the main piston 27.

The supply aperture 3 is provided in the main piston 27 to limit the supply of pilot fluid to the pilot valve chamber 37. The supply aperture 3 comprises a plurality of aperture bores 39, 41. Each aperture bore 39, 41 comprises two sections 43, 45. In one radially outer section 43, the diameter of the aperture bores 39, 41 is larger than in a radially inner section 45. The aperture bores 39, 41 are disposed in the main piston 27 so as to be offset axially and over the circumference. All aperture bores 39, 41 are uniformly supplied with pilot fluid via a circumferential groove 47 of the main piston 27. To reduce the opening cross-section of the supply aperture 3, a control element 49 in the form of a collar is provided on the pilot valve closing member 33. By pilot valve closing member 33, the aperture bores 39, 41 can be reduced or closed entirely depending on the axial position of the pilot valve closing member 33 relative to the main piston 27. The further the pilot valve closing member 33 is drawn out of the main piston 27, the greater the extent to which the opening cross-section of the supply aperture 3 is reduced. The collar 49 comprises pressure-relief bores 51 which are distributed over the circumference. By this design, the control behavior of the pilot valve closing member 33 is not noticeably changed by the collar 49. The supply aperture 3 can be provided in the proximity of, or at a relatively great axial distance from, the pilot valve seat 35. If the supply aperture 3 is disposed sufficiently close to the pilot valve seat 35, the adjustment regions of the pilot valve 31 and the control of the opening cross-section of the supply aperture 3 overlap. Given a sufficiently large separation, the pilot valve closing member 33 must initially move so far away from the pilot valve seat 35 that the pilot valve seat 35 is completely opened before the opening cross-section of the supply aperture 3 is reduced.

In addition, an aperture slot 53 is assigned to the supply aperture 3. The aperture slot 53 is located between the fluid inlet 21 and the supply aperture 3 and is formed by an annular gap 55 between the main piston 27 and the valve housing 7. The aperture slot 53 has a filtration function. It is intended to prevent relatively large particles in the fluid from entering and obstructing the pilot valve 31. This entry of particles would invariably result in a failure of the valve 1.

The pilot valve closing member 33 has a pointed cone 57 and cooperates with the pilot valve seat 35, which is matched thereto, at one end 59 of an axial bore 61 of the main piston 27. The pilot valve closing member 33 is acted upon by a stiff spring 63, which is supported on the pilot valve closing member 33 via a disk 65 and a snap ring 67. When an actuating device 69 is inactive, the valve 1 is therefore preloaded into the blocking position (FIG. 1).

The actuating device 69 is designed as a pulling actuating device 69 to draw the pilot valve closing member 33 away from the pilot valve seat 35 when current flows through said actuating device.

The maximum volumetric flow controller 5 is located in the main piston 27 downstream of the pilot valve seat 35. The maximum volumetric flow controller 5 is disposed in an outflow 71 between the pilot chamber 37 and the fluid outlet 23. The maximum volumetric flow controller 5 comprises a control piston 73, which is acted upon on the front face 75 by the pilot fluid stream and is acted upon in the opposite direction on the rear face 77 by a spring 79. The control piston 73 comprises a fluid channel 81 having a lateral inlet opening 83 that functions as a metering aperture. The pilot fluid can therefore enter the control piston 73 and flow into the fluid outlet 23 through radial bores 85, 87 in the control piston 73 and in the main piston 27. These bores form a control aperture. The metering aperture has a flow-control function. Depending on the opening position of the control aperture formed by the bores 85, 87, the rear face 77 of the control piston 73 is acted upon by pressure that is reduced by the control aperture. The bores 85, 87 in the control piston 73 and the main piston 27 thereby form control edges of the maximum volumetric flow controller 5, which limit the opening cross-section depending on the position of the control piston 73. The spring 79 is positioned between a recess 89 of the control piston 73 and a recess 91 of an end cap 93, which end cap is fastened in the main piston 27. To keep the design as simple as possible, the control piston 73 is inserted into the axial bore 61 of the main piston 27. The end cap 93 is screwed into an internal thread 95 of the axial bore 61 or is held in a clamped manner in the axial bore 61.

In addition, an adjustable maximum limitation of the opening stroke of the main piston 27 is provided. By a mechanically adjustable maximum stroke limitation on the actuating device 69, the maximum volumetric flow of the valve 1 can be mechanically adjusted independently of the magnetic force of the actuating device 69.

A portion of the main piston 27 in the region of the fluid inlet 21 is shown in FIG. 4. The main piston 27 is provided with a circumferential constriction 99 directly adjacent to a conical main valve surface 97 in the direction of the fluid outlet 23. That constriction 99 has a V-shaped design.

A valve 1 therefore has an opening stroke that is dependent on the actuating device 69 and on the load pressure prevailing at the fluid inlet 21. The effect of a high load pressure is that the opening stroke is reduced. If the load pressure is too low, the opening stroke can be increased by enlarging the supply aperture 3. The requirements for a leakage-free valve 1, which ensures a uniform volumetric flow even in the presence of a low pressure differential and which is independent of the prevailing load pressure, are therefore met.

Due to the integration of the volumetric flow control, the solution according to the invention also requires less installation space than the known solutions, in which a maximum volumetric flow controller or a pressure regulator is disposed downstream of conventional proportional directional poppet valve. Finally, this valve can also be produced at lower cost.

While one embodiment has been chosen to illustrate the invention, it will be understood by those skilled in the art that various changes and modifications can be made therein without departing from the scope of the invention as defined in the claims.

The invention claimed is:
1. A valve, comprising:
a valve housing having a fluid inlet and a fluid outlet;
a main piston movable in said housing and adjusting a main fluid stream between said fluid inlet and said fluid outlet;

a pilot valve chamber on a rear face of said main piston;
a pilot valve closing member movable by an actuator and adjusting a pilot fluid stream between said pilot chamber and said fluid outlet; and
a supply aperture located between said fluid inlet and pilot chamber, an opening cross section of said supply aperture being reduceable by a control element assigned to said valve closing member.

2. A valve according to claim 1 wherein
said control element comprises a radial projection on said pilot valve closing member.

3. A valve according to claim 2 wherein
said radial projection comprises a collar on said pilot valve closing member, said collar having at least one pressure-relief bore.

4. A valve according to claim 1 wherein
said supply aperture comprises a plurality of aperture bores, an opening cross section of at least one of said aperture bores being reduceable by control element.

5. A valve according to claim 4 wherein
each of said aperture bores have a same diameter.

6. A valve according to claim 4 wherein
said aperture bores are in said main piston and are offset relative to one another at least one of axially or over a circumference of said main piston.

7. A valve according to claim 1 wherein
an aperture slot is between said fluid inlet and said supply aperture.

8. A valve according to claim 7 wherein
said aperture slot comprises an annular gap between said valve housing and said main piston.

9. A valve according to claim 1 wherein
a maximum volume controller is in said main piston in an outflow between said pilot valve chamber and said fluid inlet.

10. A valve according to claim 9 wherein
said maximum volumetric flow controller comprises a control piston acted on a front face thereof by pressure of fluid flowing out of said pilot valve chamber and acted on a rear face thereof by a spring.

11. A valve according to claim 10 wherein
said control piston comprises a fluid channel therein; and
control edges of said maximum volumetric flow controller are in said control piston and in said main piston as bores therein, opening cross sections limited by said control edges being dependent on positions of said control piston.

12. A valve according to claim 11 wherein
said fluid channel comprises a lateral inlet opening in said control piston.

13. A valve according to claim 11 wherein
said control piston is in an axial bore in said main piston.

14. A valve according to claim 13 wherein
said control piston is held in said axial bore by an end cap.

15. A valve according to claim 1 wherein
said main piston is biased toward a closing position by a spring via said pilot valve closing member.

16. A valve according to claim 1 wherein
said pilot valve closing member is drawable away from a pilot valve seat by said actuator.

17. A valve, comprising:
a valve housing having a fluid inlet and a fluid outlet;
a main piston movable in said housing and adjusting a main fluid stream between said fluid inlet and said fluid outlet;
a pilot valve chamber on a rear face of said main piston;
a pilot valve closing member movable by an actuator and adjusting a pilot fluid stream between said pilot chamber and said fluid outlet; and
a supply aperture located between said fluid inlet and pilot chamber, an opening cross section of said supply aperture being reduceable by a control element, said supply aperture including a plurality of aperture bores, an opening cross section of at least one of said aperture bores being reduceable by a control element.

18. A valve according to claim 17 wherein
each of said aperture bores have a same diameter.

19. A valve according to claim 17 wherein
said aperture bores are in said main piston and are offset relative to one another at least one of axially or over a circumference of said main piston.

20. A valve, comprising:
a valve housing having a fluid inlet and a fluid outlet;
a main piston movable in said housing and adjusting a main fluid stream between said fluid inlet and said fluid outlet;
a pilot valve chamber on a rear face of said main piston;
a pilot valve closing member movable by an actuator and adjusting a pilot fluid stream between said pilot chamber and said fluid outlet;
a supply aperture located between said fluid inlet and pilot chamber, an opening cross section of said supply aperture being reduceable by a control element; and
a maximum volume controller in said main piston in an outflow between said pilot valve chamber and said fluid inlet, said maximum volumetric flow controller including a control piston acted on a front face thereof by pressure of fluid flowing out of said pilot valve chamber and acted on a rear face thereof by a spring.

21. A valve according to claim 20 wherein
said control piston comprises a fluid channel therein; and
control edges of said maximum volumetric flow controller are in said control piston and in said main piston as bores therein, opening cross sections limited by said control edges being dependent on positions of said control piston.

22. A valve according to claim 21 wherein
said fluid channel comprises a lateral inlet opening in said control piston.

23. A valve according to claim 20 wherein
said control piston is in an axial bore in said main piston.

24. A valve according to claim 23 wherein
said control piston is held in said axial bore by an end cap.

* * * * *